(12) United States Patent
Hamada et al.

(10) Patent No.: US 6,246,463 B1
(45) Date of Patent: Jun. 12, 2001

(54) OPTICAL LASER SCANNING DEVICE AND IMAGE FORMING APPARATUS HAVING THE OPTICAL LASER SCANNING DEVICE

(75) Inventors: Takatoshi Hamada; Makoto Obayashi, both of Toyokawa; Masayuki Tanaka, Gamagoori; Kazuyoshi Noguchi, Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/304,829

(22) Filed: May 5, 1999

(30) Foreign Application Priority Data

Aug. 8, 1998  (JP) ................................... 10-125936

(51) Int. Cl.[7] .................................................. G03B 27/52
(52) U.S. Cl. ................................................. 355/41; 355/40
(58) Field of Search ................................. 355/27, 40, 41, 355/47; 347/232, 233; 358/296

(56) References Cited

U.S. PATENT DOCUMENTS

| 4,596,995 | * | 6/1986 | Yamkawa et al. | 346/160 |
| 4,823,151 | * | 4/1989 | Miura | 346/160 |
| 4,853,710 | * | 8/1989 | Shimada et al. | 346/108 |
| 5,164,745 | * | 11/1992 | Matsuoka | 346/108 |
| 5,179,392 | * | 1/1993 | Kawaguchi | 346/108 |
| 5,315,321 | * | 5/1994 | Peled et al. | 346/108 |
| 5,717,451 | * | 2/1998 | Katano et al. | 347/242 |
| 5,930,019 | * | 7/1999 | Suzuki et al. | 359/204 |

FOREIGN PATENT DOCUMENTS 07199096  4/1995  (JP) .

* cited by examiner

*Primary Examiner*—Russell Adams
*Assistant Examiner*—Hung Henry Nguyen
(74) *Attorney, Agent, or Firm*—McDermott, Will & Emery

(57) ABSTRACT

In an image forming apparatus employing a multi-beam method, the total emission period of time is stored for each laser beam. In accordance with the total emission periods of the laser beams, the laser beam used for SOS is switched, so that the total emission periods are kept almost equal to each other. When the laser beam used for the SOS is switched, the adjustment processing for correcting misalignment of the laser beams in the main scanning direction is changed in accordance with the current laser beam used for the SOS, and the emitting order of the laser beams for the APC is also accordingly changed.

17 Claims, 13 Drawing Sheets

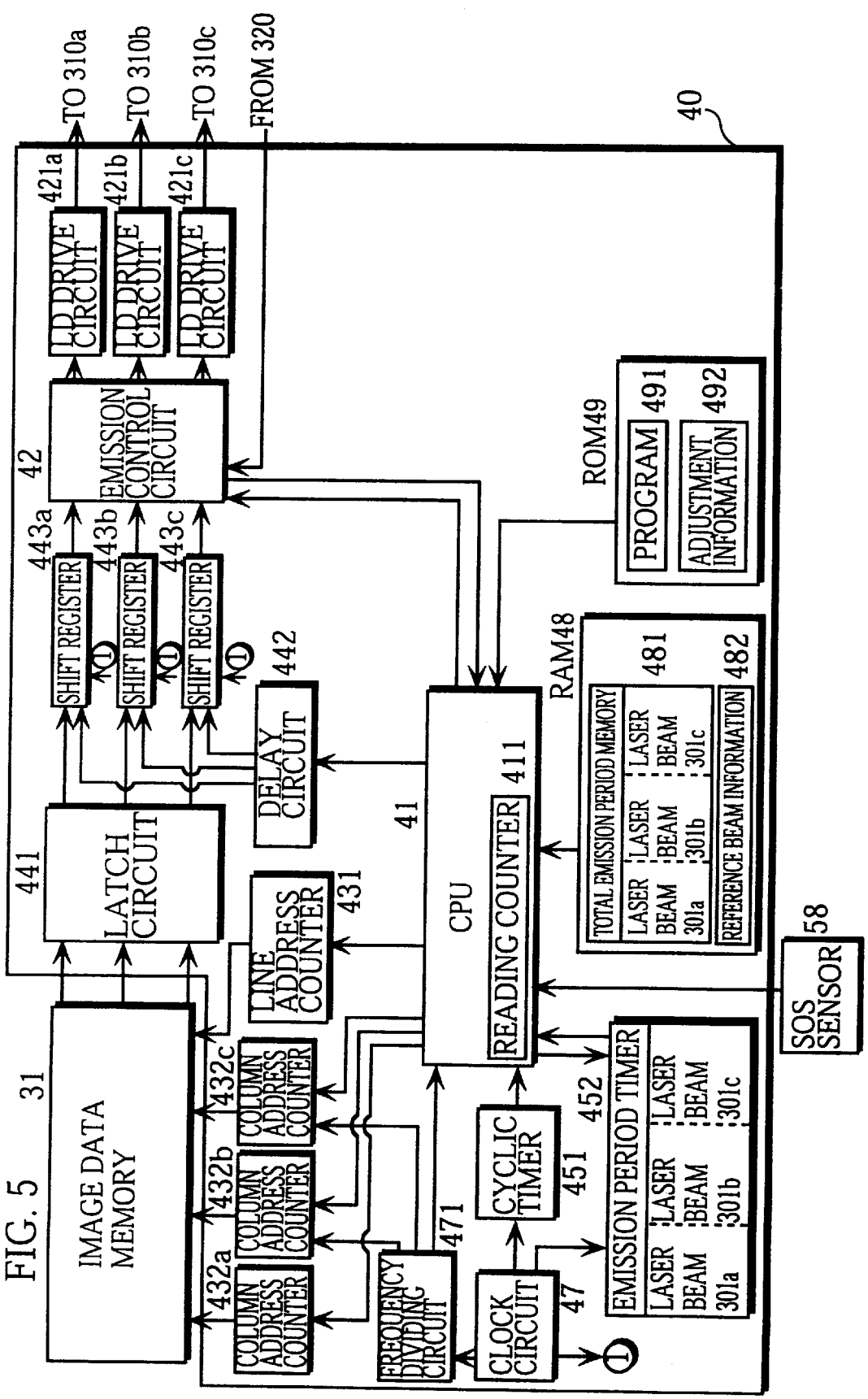

PRIOR ART

OPTICAL LASER SCANNING DEVICE AND IMAGE FORMING APPARATUS HAVING THE OPTICAL LASER SCANNING DEVICE

This application is based on application No. 10-125936 filed in Japan, the content of which is hereby incorporated by reference.

BACKGROUND OF THE INVENTION

(1) Field of the Invention

The present invention relates to an optical laser scanning device, and particularly relates to an optical laser scanning device employing a multi-beam method and to an image forming apparatus having the optical laser scanning device as the main component.

(2) Description of Related Art

An image forming apparatus employing the multi-beam method is provided with a semiconductor laser array that is capable of emitting a plurality of laser beams at a time in an optical system. By striking a plurality of scanning lines at a time, the speed of scan processing is improved. Also, by scanning the laser beams on one scanning line, image quality is improved.

There may be three different purposes in emitting the laser beams using the semiconductor laser array. The first purpose is to strike a surface of a photosensitive component according to image data. The second purpose is to detect a Start-of-Scan (referred to as the "SOS" hereinafter). The SOS means a position from which the scanning is started, and this position may be also referred to as the "scanning start position" hereinafter. The third purpose is to perform an Auto Power Control (referred to as the "APC" hereinafter).

The SOS detection is performed such that the scanning start positions according to the image data are aligned for all main scanning lines on the photosensitive component. By means of the SOS detection processing, a timing at which an image based on the image data is written on the surface of the photosensitive component is determined for all main scanning lines.

The APC is performed to avoid the following problem. Due to environmental conditions, such as increased temperature, the light intensity emitted from a laser diode (referred to as the "LD" hereinafter) element varies even under the same current. To avoid this problem, a photo diode detects the intensity of light emitted from the LD element under a predetermined current, and the current to be applied to the LD element is adjusted in accordance with a difference between the detected light intensity and a target value.

Out of the three purposes, the purpose of detecting the SOS further includes two objectives. One is to align the scanning start positions for every scanning process, as is the case of an optical system provided in an image forming apparatus employing a single-beam method. The other is to align the scanning start positions for all laser beams emitted at one time for every scanning process. When the semiconductor laser array employing the multi-beam method is used, the latter objective needs to be particularly performed for a case where phase shifts in the scanning start positions are caused between the laser beams due to the placement of the semiconductor laser array.

The technique for aligning the scanning start positions for all laser beams is disclosed in the U.S. Pat. No. 4,853,710. In this document, the SOS detection is performed for one of the laser beams, and phase shifts in the scanning start positions between the laser beams are corrected by delaying the scanning start timings of the corresponding laser beams. Hereinafter, the laser beam used for detecting the SOS and used as the reference for adjusting the scanning start positions is referred to as the "reference beam."

FIG. 14 is a timing chart showing the timings at which the laser beams are emitted corresponding to the stated three purposes. As shown in FIG. 14, a laser beam is emitted for every scanning line, and a laser beam ①is used as the reference beam. The start timings of emitting the laser beams which strike the surface of the photosensitive component differ from each other (as indicated by SOI①, SOI②, and SOI③in FIG. 14). By means of these different timings, the phase shifts between the laser beams are corrected. The emissions 1411 and 1412 for the APC are performed between an end of the emission onto the photosensitive component (indicated as "EOI③" in FIG. 14) and an emission 1401 for a next SOS detection. It should be noted here that the emission 1401 of the reference beam for the SOS detection is also used for the APC.

In this processing, however, a period of time during which the laser beam used as the reference beam has been emitted is longer than other periods of time during which the other two laser beams have been respectively emitted. This means that the life of a light source in the semiconductor laser array corresponding to the LD element that is used for emitting the reference beam is shortened, as compared with the light sources corresponding to the LD elements that are used for emitting the other laser beams. For this reason, even when the other light sources can be still used, the semiconductor laser array needs replacing if the life of the light source of the reference beam ends. In addition, the maintenance accompanying this replacement is often required.

SUMMARY OF THE INVENTION

The first object of the present invention is to provide an optical laser scanning device that increases the life of a semiconductor laser array emitting a plurality of laser beams, thereby reducing maintenance costs.

The second object of the present invention is to provide an image forming apparatus having an optical laser scanning device, as the main component, that increases the life of a semiconductor laser array emitting a plurality of laser beams, thereby reducing maintenance costs.

The third object of the present invention is to provide an optical laser scanning method, by which the life of a semiconductor laser array emitting a plurality of laser beams is increased, thereby reducing maintenance costs.

The first object of the present invention can be achieved by an optical scanning device made up of: a plurality of light sources which each emit a laser beam; a scanning unit which repetitively scans the laser beams emitted by the plurality of light sources; a selector which selects one of the light sources, a beam emitted by the selected light source being a reference beam; and a sensor which receives the reference beam at a predetermined position and outputs a synchronizing signal in response to the reception of the reference beam, the synchronizing signal being used for separately setting timings at which the light sources will respectively emit the laser beams to form an image in accordance with image information.

The first object of the present invention can be also achieved by an optical scanning device which scans a plurality of laser beams, the optical scanning device made up of: a plurality of light sources which each emit a laser beam; a sensor which receives a reference beam emitted by one of the light sources at a predetermined position and outputs a reference signal in response to the reception of the reference beam; a controller which separately sets timings at which the light sources will emit the laser beams in accordance with image information, based on the reference signal; and a switching unit which switches the light source used for emitting the reference beam.

With this construction, the remaining lives of light sources are kept almost equal to each other. As a result, the occurrence of maintenance for replacing the semiconductor laser array which includes the light sources can be reduced and maintenance costs can be also reduced.

The second object of the present invention can be achieved by an image forming apparatus made up of: an optical scanning device which includes, a plurality of light sources which each emit a laser beam, a scanning unit which repetitively scans the laser beams emitted by the plurality of light sources, a selector which selects one of the light sources, a beam emitted by the selected light source being a reference beam, and a sensor which receives the reference beam at a predetermined position and outputs a synchronizing signal in response to the reception of the reference beam, the synchronizing signal being used for separately setting timings at which the light sources will respectively emit the laser beams to form an image in accordance with image information; and an image holding component on which an image is formed by the optical scanning device.

The second object of the present invention can be also achieved by an image forming apparatus made up of: an optical scanning device which scans a plurality of laser beams, including a plurality of light sources which each emit a laser beam, a sensor which receives a reference beam emitted by one of the light sources at a predetermined position and outputs a reference signal in response to the reception of the reference beam, a controller which separately sets timings at which the light sources will emit the laser beams in accordance with image information, based on the reference signal, and a switching unit which switches the light source used for emitting the reference beam; and an image holding component on which an image is formed by the optical scanning device.

The third object of the present invention can be achieved by a scanning method for scanning a plurality of laser beams at a time, the plurality of laser beams having been modulated with image information and being respectively emitted by a plurality of light sources, the scanning method including: a selecting step of selecting one of the light sources; an emitting step of emitting a reference beam from the selected light source; an outputting step of outputting a synchronizing signal from a sensor in response to a reception of the reference beam; a setting step of separately setting, in accordance with the synchronizing signal, timings at which the light sources will emit the laser beams in accordance with the image information; and a scanning step of scanning the laser beams.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 is a block diagram showing the construction of a control unit;

DESCRIPTION OF THE PREFERRED EMBODIMENT

The following is a description of an embodiment of an image forming apparatus to which the present invention is applied, with reference to the drawings. In the embodiment, a digital copier (referred to as the "copier 1" hereinafter) is used as an example of such image forming apparatus.

Overall Construction of the Copier 1

Figure 1:
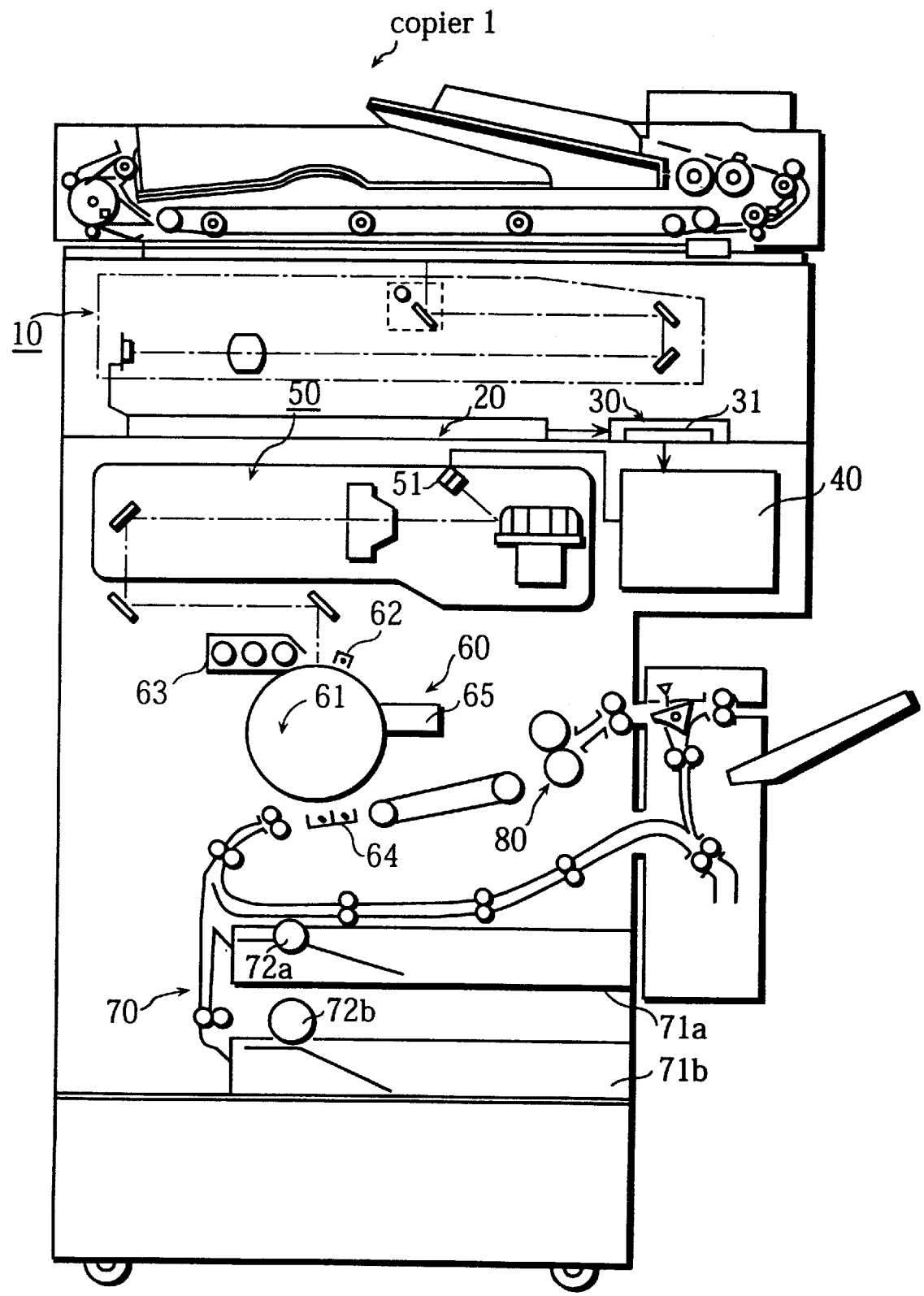
FIG. 1 is a schematic cross-sectional view showing the construction of a copier of an embodiment according to the present invention.

FIG. 1 is a schematic cross-sectional view showing the construction of the copier 1 of the embodiment according to the present invention.

The copier 1 is composed of an image reading unit 10, an image signal processing unit 20, a memory unit 30, a control unit 40, an optical scanning system 50, an image forming system 60, a paper feeding unit 70, and a fixing unit 80.

The image reading unit 10 reads an original and transmits the read image data to the image signal processing unit 20.

The image signal processing unit 20 performs correction processes on the image data transmitted from the image reading unit 10 such that the original image is faithfully reproduced. After the correction processes, the image data is stored in the memory unit 30.

The memory unit 30 stores the image data on which the image signal processing unit 20 performs the correction processes into an image data memory 31. When receiving an instruction from the control unit 40 to output the image data, the memory unit 30 outputs the image data specified by a line address (n) and a column address (m) to the control unit 40. Here, one line of data is outputted for each laser beam. In the present embodiment, three lines of data corresponding to three laser beams are outputted in parallel at a time.

The optical scanning system 50 emits the laser beams which have been modulated with the image data transmitted from the memory unit 30 via the control unit 40, and exposes a surface of a photosensitive component 61 using the laser beams. As a result, an electrostatic latent image is formed on the surface of the photosensitive component 61. The construction and processing of the optical scanning system 50 are described in detail later in this specification.

The control unit 40 sequentially has the image data outputted from the memory unit 30. The control unit 40 then drives a semiconductor laser array 51 of the optical scanning system 50 in accordance with the read image data, so that the laser beams are generated. Here, the control unit 40 performs processing to make adjustment in the scanning start positions between the laser beams. The construction and processing of the control unit 40 are described in detail later in this specification.

As shown in FIG. 1, the image forming system 60 is composed of a sensitizing charger 62, a developing unit 63, a transfer unit 64, and a cleaner 65 provided around the photosensitive component 61 that is also included in the image forming system 60. The sensitizing charger 62 charges the photosensitive component 61, which is rotationally driven, to ensure a predetermined surface potential of the photosensitive component 61. The developing unit 63 develops the electrostatic latent image formed on the surface of the photosensitive component 61 by the optical scanning system 50 into a toner image. The transfer unit 64 transfers the toner image formed on the photosensitive component 61 onto a recording sheet. The cleaner 65 removes remaining toner particles from the surface of the photosensitive component 61 after the toner image is transferred onto the recording sheet.

The paper feeding unit 70 includes feeding cassettes 71a and 71b, and feeding rollers 72a and 72b. The feeding roller 72a or 72b is rotated to take up one recording sheet at a time from the corresponding feeding cassette 71a or 71b. The recording sheet is then transported to the transfer unit 64.

The fixing unit 80 includes a pair of rollers. The toner image transferred onto the recording sheet is fused and fixed in place by the pair of rollers with heat.

Description of the Optical Scanning System 50

Figure 2:
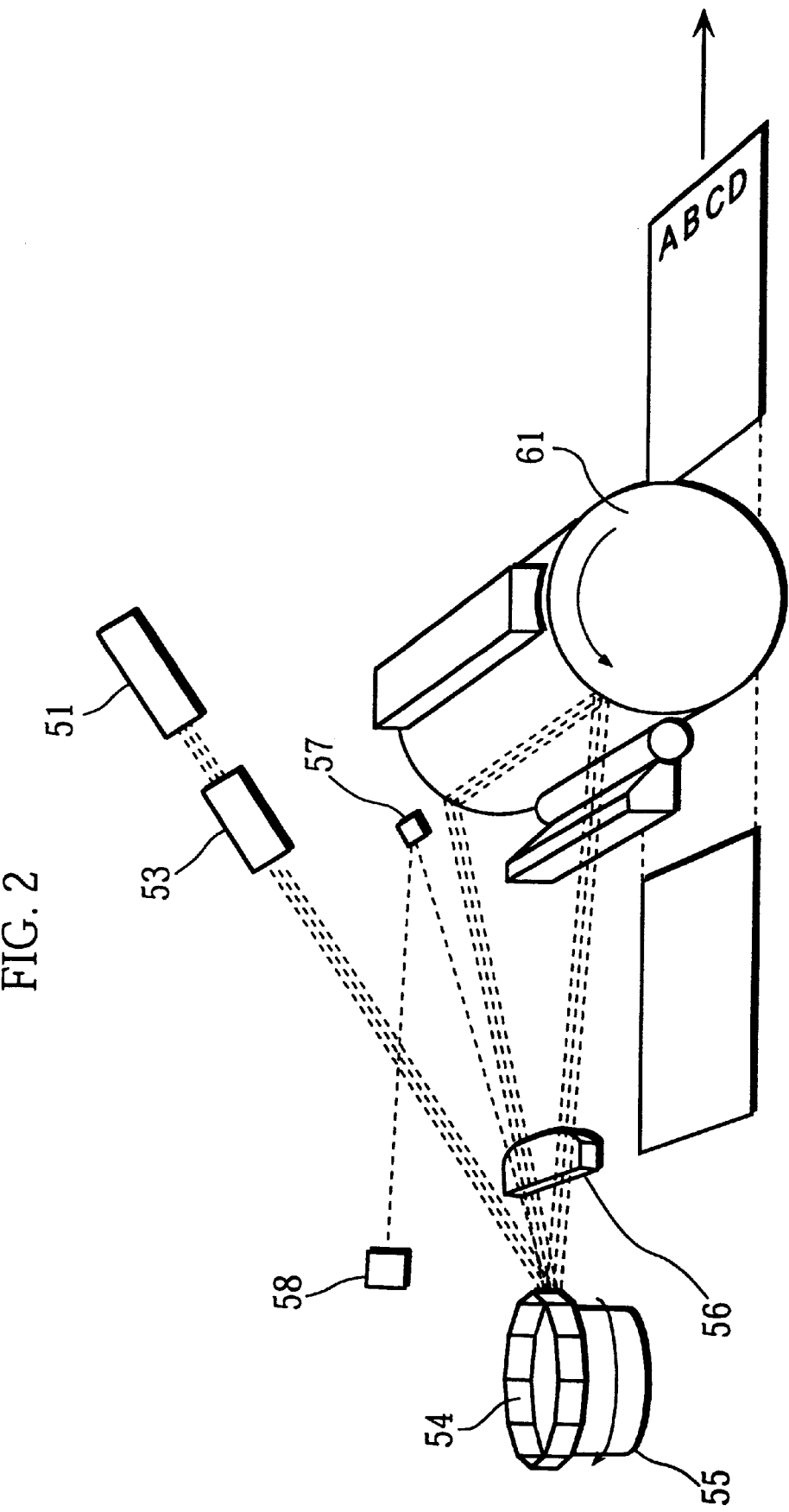
FIG. 2 is a perspective view showing the construction of an optical system provided in the copier.

FIG. 2 is a perspective view showing the construction of the optical scanning system 50 provided in the copier 1.

The optical scanning system 50 is composed of a semiconductor laser array 51, a collimator lens 53, a polygon mirror 54, a motor 55, an f-θ lens 56, a sensor mirror 57, and an SOS sensor 58. Note that mirrors used for guiding the laser beams passed through the f-θ lens 56 to the surface of the photosensitive component 61 are not illustrated in FIG. 2 for convenience in drawing this figure.

The laser beams emitted from the semiconductor laser array 51 become parallel beams after passing through the collimator lens 53. The laser beams are then deflected on a mirror face of the polygon mirror 54 to strike the surface of the photosensitive component 61. The motor 55 rotates the polygon mirror 54 at a constant speed. The f-θ lens 56 is used for adjusting deflection angle speeds of the laser beams reflected off the polygon mirror 54, so that the laser beams strike the photosensitive component 61 at a constant speed.

The sensor mirror 57 is located at a predetermined position adjacent to one of the rear and front sides (the rear side in the present embodiment, as the optical scanning system 50 is viewed in FIG. 2) of the photosensitive component 61. The laser beam used for the SOS detection (i.e., the reference beam) is reflected off the sensor mirror 57 and incident on the SOS sensor 58. The SOS sensor 58 receives the emission of the reference beam deflected by the polygon mirror 54 and, in response to the emission, transmits a synchronizing signal to the control unit 40.

Figure 3:
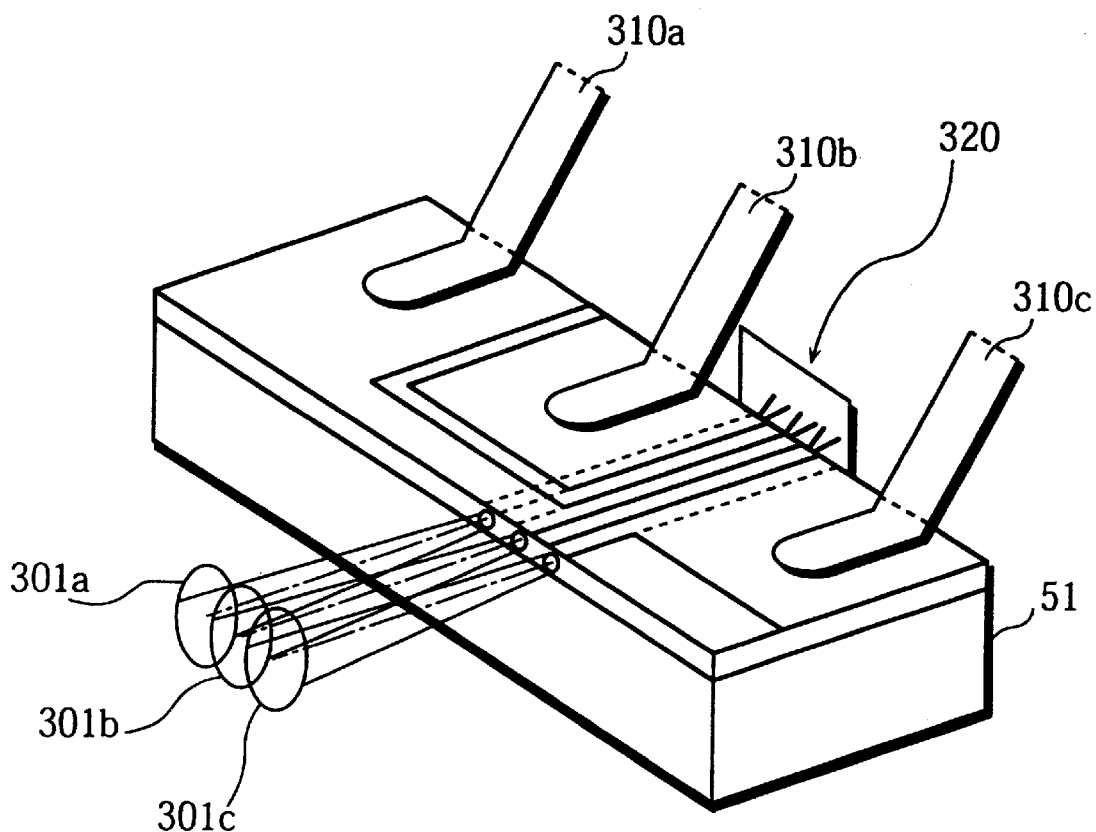
FIG. 3 is a perspective view showing the construction of a semiconductor laser array.

FIG. 3 is a perspective view showing the construction of the semiconductor laser array 51. The semiconductor laser array 51 emits the three laser beams modulated with the corresponding three lines of image data. For doing so, the semiconductor laser array 51 receives three lines of signal currents, which has been converted from the image data, from the control unit 40 through three Au wires 310a, 310b, and 310c. In accordance with the received three lines of signal currents, the semiconductor laser array 51 emits three laser beams 301a, 301b, and 301c to the collimator lens 53.

A photo diode 320 detects the respective light intensities of the laser beams 301a to 301c and informs the control unit 40 of them. This monitoring process of detecting the light intensities by the photo diode 320 is performed for the APC.

The laser beams 301a to 301c are emitted from different light sources in the semiconductor laser array 51, as shown in FIG. 3. A distance between the laser beams 301a to 301c striking the surface of the photosensitive component 61 is set at a predetermined distance in the sub-scanning direction. Here, the semiconductor laser array 51 is disposed at an angle, thereby enabling the distance between the laser beams 301a to 301c to be short. However, due to the tilt angle, the laser beams 301a to 301c emitted from the semiconductor laser array 51 are not aligned in the main scanning direction, causing phase shifts in the scanning start position.

Figure 4:
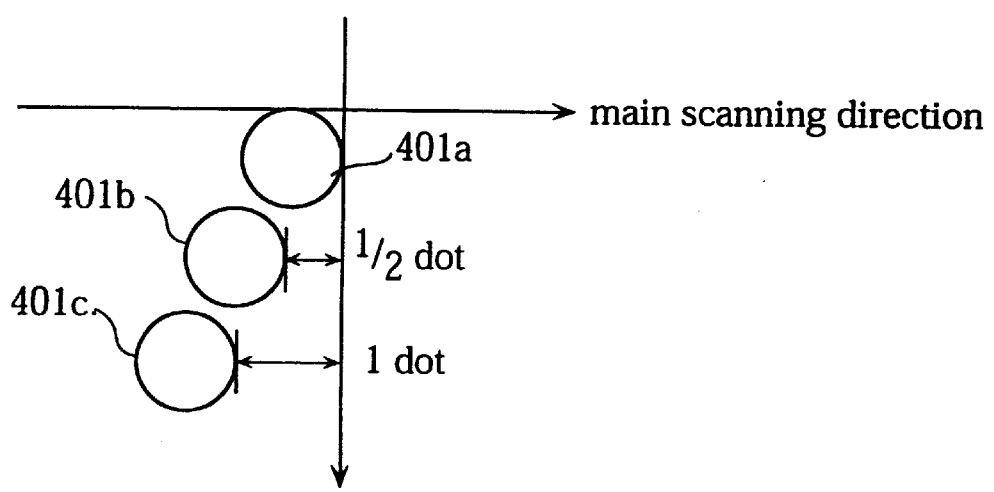
FIG. 4 is a drawing to help explain phase shifts in the scanning start positions between the laser beams.

FIG. 4 is a drawing to help explain the phase shifts in the scanning start position between the laser beams 301a to 301c in the main scanning direction. Beam spots 401a, 401b, and 401c respectively indicate the scanning start positions of the laser beams 301a, 301b, and 301c. As shown in FIG. 4, the beam spot 401b is situated a ½-dot length ahead of the beam spot 401a in the main scanning direction, and the beam spot 401c is situated a ½-dot length ahead of the beam spot 401b in the main scanning direction. This means that the phase shift between the beam spots 401a and 401c is a 1-dot length in the main scanning direction. Due to these phase shifts, jitter could result on the image formed on the recording sheet. Therefore, the phase shifts between the laser beams 301a to 301c need to be eliminated by making the adjustment. Processing for eliminating the phase shifts is performed by the control unit 40.

Description of the Control Unit 40

FIG. 5 is a block diagram showing the construction of the control unit 40. The control unit 40 is composed of a CPU 41, an emission control circuit 42, a line address counter 431, column address counters 432a, 432b, and 432c, a latch circuit 441, a delay circuit 442, shift registers 443a, 443b, and 443c, a cyclic timer 451, an emission period timer 452, a clock circuit 47, a RAM 48, and a ROM 49.

Out of information required for control processing, the ROM 49 stores information whose content is fixed, such as a program 491. Adjustment information 492 indicates how each scanning start position of the laser beams is adjusted, depending on the current reference beam. The adjustment is explained on a reference beam basis later in the description of the CPU 41.

Meanwhile, the RAM 48, which is nonvolatile, stores information whose content changes. A total emission period memory 481 of the RAM 48 stores information for each laser beam regarding a period of time during which the laser beam has been emitted. Hereinafter, the period of time during which the laser beam has been emitted may be referred to as the "emission period." A reference beam information 482 indicates an identification data (ID) of the laser beam which is currently being used as the reference beam.

The image data is stored in the image data memory 31 in units of lines. The line address counter 431 holds a line address assigned to a line corresponding to the laser beam 301a. Here, the laser beam 301a is used for striking the first line in a next scanning process. In accordance with an instruction from the CPU 41 which receives a synchronizing signal outputted in response to the SOS detection, the line address counter 431 informs the memory unit 30 of the line address. Then, the memory unit 30 outputs the image data corresponding to the line address. In the present embodiment, three lines are written at the same time for each scanning process. Therefore, when the line address held by the line address counter 431 is "n", lines to be outputted from the image data memory 31 are $n^{th}$, $(n+1)^{th}$, and $(n+2)^{th}$ lines.

Each of column address counters 432a to 432c holds a column address assigned to data (or, a pixel) that is to be outputted. In the copier 1, three lines of image data are read from the image data memory 31 at the same time. The column address counter 432a manages the column addresses of data associated with the first line out of the three lines. Similarly, the column address counters 432b and 432c respectively manage the column addresses of data associated with the second and third lines. Each value of the column addresses held by the column address counters 432a to 432c is counted up every time a pixel clock is received from the clock circuit 47 via a frequency dividing circuit 471. The column address counters 432a to 432c are respectively activated on receiving an instruction from the CPU 41 to start counting. When activated, the column address counters 432a to 432c inform the memory unit 30 of the respective column addresses from which the output of the image data should be started. After this, every time the value of the column address is counted up, the corresponding column address counter 432a to 432c informs of the memory unit 30 of the counted value. Whenever the column address has been notified from the corresponding column address counter 432a to 432c, 1 pixel (or, 1 dot) of image data is outputted from the image data memory 31.

The three lines of image data are sequentially outputted by 1 pixel at a time from the image data memory 31 to the latch circuit 441. The latch circuit 441 temporarily stores the image data for each line. On receiving an instruction from the CPU 41 to output the image data, the latch circuit 441 outputs the image data for each line to the shift registers 443a, 443b, and 443c.

After receiving the image data of the corresponding line transmitted from the latch circuit 441, each of the shift registers 443a to 443c outputs the image data to the emission control circuit 42. When doing so, the shift registers 443a to 443c delay outputting the image data by respective shift clocks transmitted from the delay circuit 442.

On receiving an instruction from the CPU 41, the cyclic timer 451 is activated. The cyclic timer 451 measures a period of time T1 elapsed between the reception of the synchronizing signal and an emission for a next SOS detection. When the period of time T1 has elapsed, the cyclic timer 451 notifies so to the CPU 41.

The emission period timer 452 measures periods of time during which the laser beams 301a to 301c have been respectively emitted. For doing so, the emission period timer 452 receives information required for the measurement, such as count start/end timings and ID of the laser beam. The emission period timer 452 informs the CPU 41 of the measurement results.

In accordance with the measured emission periods, the CPU 41 performs processing to switch the laser beam used as the reference beam between the laser beams 301a to 301c. The CPU 41 also adjusts the scanning start position between the laser beams. The adjustment in the scanning start position between the laser beams is differently performed, depending on the laser beam that is currently being used as the reference beam.

The switching of the reference beam and the adjustment in the scanning start position between the laser beams are explained in detail below.

(1) Switching of the Reference Beam

The CPU 41 sets one of the laser beams 301a to 301c as the reference beam in preprocessing when the copier 1 is turned on. For doing so, the CPU 41 refers to the emission periods of the laser beams 301a to 301c stored in the total emission period memory 481 of the RAM 48, and obtains a difference between the longest emission period and the shortest emission period. Then, the CPU 41 compares the difference with a threshold stored in the RAM 48 beforehand. If the difference exceeds the threshold, the CPU 41 changes the ID of the current reference beam stored in the reference beam information 482 to the ID corresponding to the laser beam whose emission period is the shortest. After this, the CPU 41 informs the emission control circuit 42 of the new ID.

The CPU 41 obtains the information regarding the emission periods that is required to switch the reference beam by the following procedure.

The CPU 41 receives notifications of the start and end of the emission by the light sources corresponding to the laser beams 301a to 301c from the emission control circuit 42. Using these notifications, the CPU 41 instructs the emission period timer 452 to measure the emission periods of the laser beams 301a to 301c.

Whenever one scanning process has been completed, the CPU 41 reads the emission periods of the laser beams 301a to 301c from the emission period timer 452 as postprocessing. Then, the CPU 41 adds the emission periods respectively to the corresponding total emission periods stored in the total emission period memory 481, and resets the emission period timer 452.

(2) Adjustment of the Scanning Start Position

The following is a description of the adjustment in the scanning start positions between the laser beams 301a to 301c that is performed by the CPU 41.

On receiving a notification from the cyclic timer 451 that the predetermined period of time T1 has elapsed, the CPU 41 instructs the emission control circuit 42 to have the corresponding laser beam (the reference beam) emitted for the SOS detection. When a synchronizing signal is sent from the SOS sensor 58, the CPU 41 has the image data outputted from the image data memory 31 to the emission control circuit 42. As a result, the laser beams 301a to 301c are emitted from the light sources. Here, before the image data is outputted from the image data memory 31 to the emission control circuit 42, the CPU 41 completes the adjustment in the scanning start positions between the laser beams 301a to 301c.

Figure 6A:
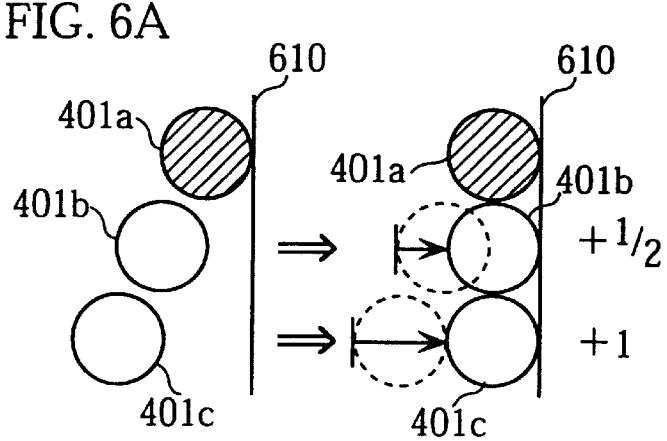
FIGS. 6A to 6C are drawings to help explain the adjustment to be made in order to maintain the same scanning start position between the laser beams, with the laser beam used as the reference beam being different in each figure.
Figure 6B:
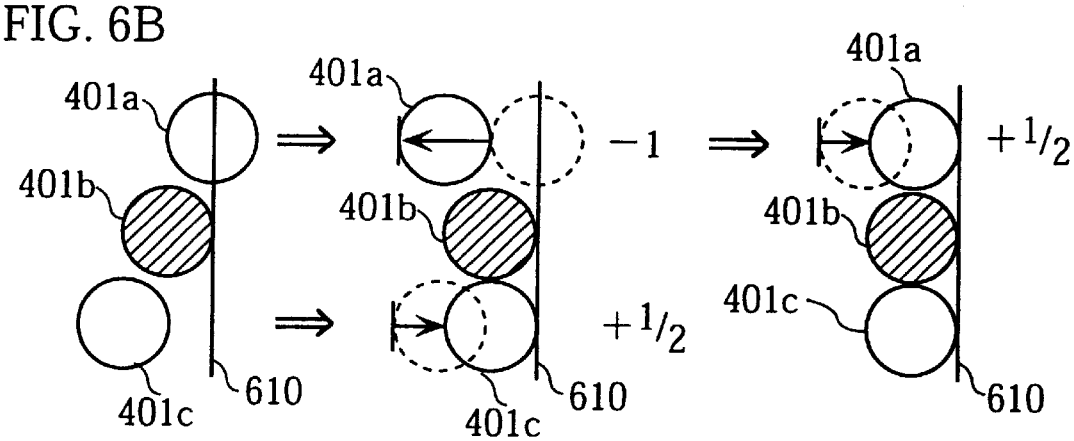
Figure 6C:
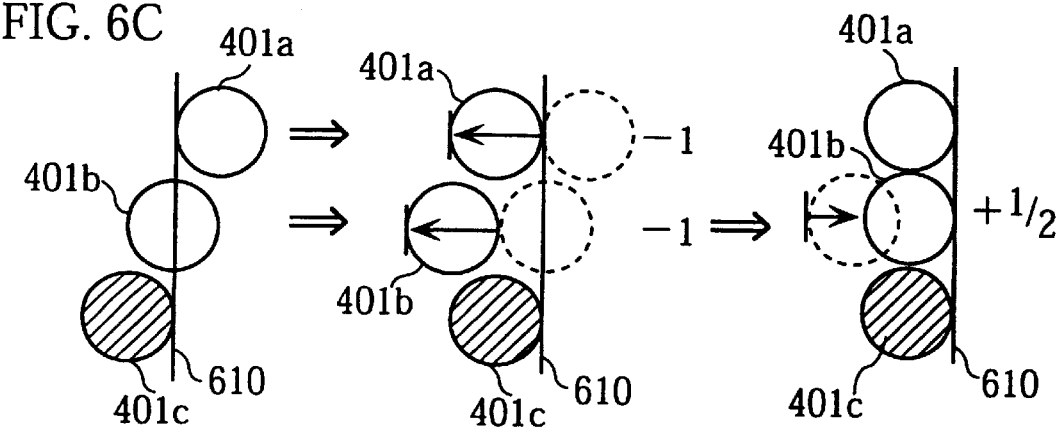

FIGS. 6A to 6C are drawings to help explain the processing for the adjustment in the scanning start positions between the laser beams 301a to 301c. In this processing, the scanning start position of the laser beam having used for detecting the SOS is set as the reference position, and the CPU 41 aligns the scanning start positions of the other two laser beams with the reference position in the sub-scanning direction. The procedure of this adjustment processing depends on the laser beam that is used as the reference beam.

FIG. 6A shows a case where the laser beam 301a is used as the reference beam. In order to neatly align the beam spots 401a to 401c along a start line 610 that indicates the correct scanning start position of the laser beams 301a to 301c, the beam spot 401b should be shifted by a ½dot and the beam spot 401c should be shifted by 1 dot to the right (as the beam spots 401a to 401c are viewed in FIG. 6A) in the main scanning direction.

Hereinafter, when a beam spot is shifted to the right in the main scanning direction, the amount of adjustment, i.e., the number of dots to be shifted, is indicated with "+(plus)." Meanwhile, when a beam spot is shifted to the left (as viewed in FIGS. 6A to 6C) in the main scanning direction, the amount of adjustment is indicated with "−(minus)." The adjustment to the right in the main scanning direction is achieved by delaying the timing at which the corresponding laser beam is emitted. The adjustment to the left in the main scanning direction is achieved by advancing the timing at which the corresponding laser beam is emitted.

FIG. 6B shows a case where the laser beam 301b is used as the reference beam. In order to neatly align the beam spots 401a to 401c along the start line 610, the beam spot 401a should be shifted to the left by a ½dot and the beam spot 401c should be shifted to the right by a ½dot.

FIG. 6C shows a case where the laser beam 301c is used as the reference beam. In order to neatly align the beam spots 401a to 401c along the start line 610, the beam spot 401a should be shifted to the left by 1 dot and the beam spot 401b should be shifted to the left by a ½dot.

Two different methods are required for shifting the scanning start positions of the laser beams 301a to 301c to the right and left in the main scanning direction. One method is used for shifting the scanning start position to the right, and is achieved using the delay circuit 442. The other method is used for shifting the scanning start position to the left, and is achieved by changing the timings at which the column address counters 432a to 432c start the processing for outputting the corresponding column addresses to the image data memory 31. The method using a delay circuit is a known art and disclosed in the U.S. Pat. No. 4,853,710.

The method using the delay circuit 442 is first explained. The CPU 41 gives an instruction to the delay circuit 442 to calculate a shift clock for each of the laser beams aside from the laser beam used as the reference beam. Then, the shift clock is transmitted to the corresponding shift register 443a to 443c. When the corresponding line of the image data from the image data memory 31 is outputted from the corresponding shift register 443a to 443c to the emission control circuit 42, the output is delayed by the shift clock. By means of the delay in outputting the image data, the scanning start timing of the corresponding laser beam is also delayed. Accordingly, the phase differences between the reference beam and the other two laser beams are corrected, and the scanning start positions of the laser beams 301a to 301c are neatly aligned.

The adjustment using the delay circuit 442 is made for shifting the scanning start position only to the right direction. Note, however, that the phase difference less than 1 dot can be corrected since the clock speed of the shift clock faster than that of the pixel clock.

Next, the method for shifting the scanning start position to the left is explained. This method is achieved by changing the timings at which the column address counters 432a to 432c start the processing to output the corresponding column addresses to the image data memory 31. Here, if no adjustments are made in the scanning start positions between the laser beams 301a to 301c, the image data is always read from the image memory 31 after a predetermined period of time has elapsed from the detection of the synchronizing signal. Yet, in order to shift the scanning start position to the left, the CPU 41 adjusts this period of time taken between the reception of the synchronizing signal and the output of the column addresses from the column address counter 432a to 432c. By means of the adjustment made by the CPU 41, the timing of outputting the image data from the image data memory 31 is changed. Consequently, the scanning start position is adjusted for each of the laser beams aside from the laser beam used as the reference beam. Note that the period of time to be adjusted by the CPU 41 is measured in units of pixel clocks by a reading counter 411 of the CPU 41.

Figure 7A:
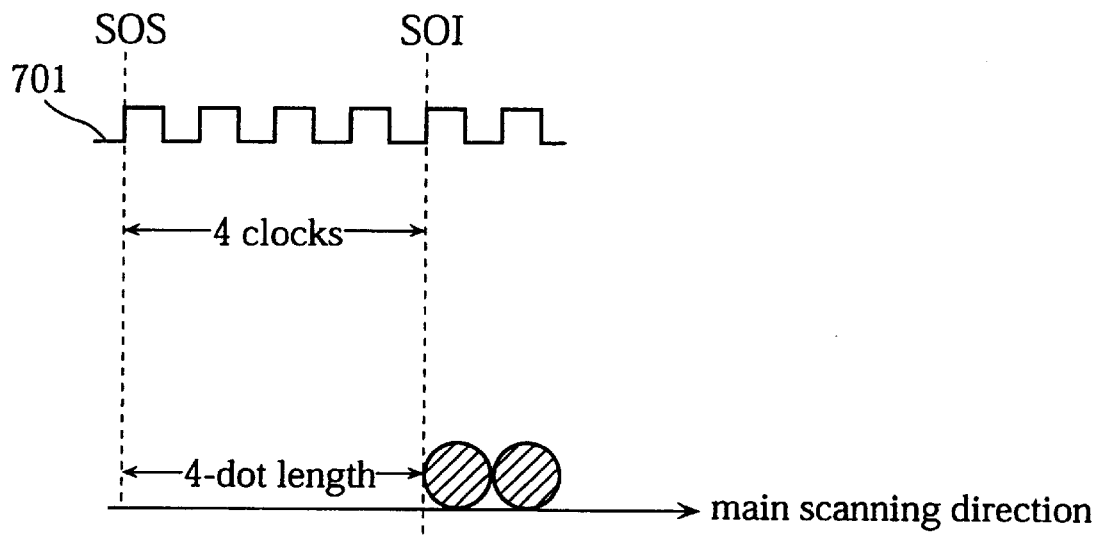
FIGS. 7A and 7B respectively show the relation between a value of a column address counter and a scanning start position.
Figure 7B:
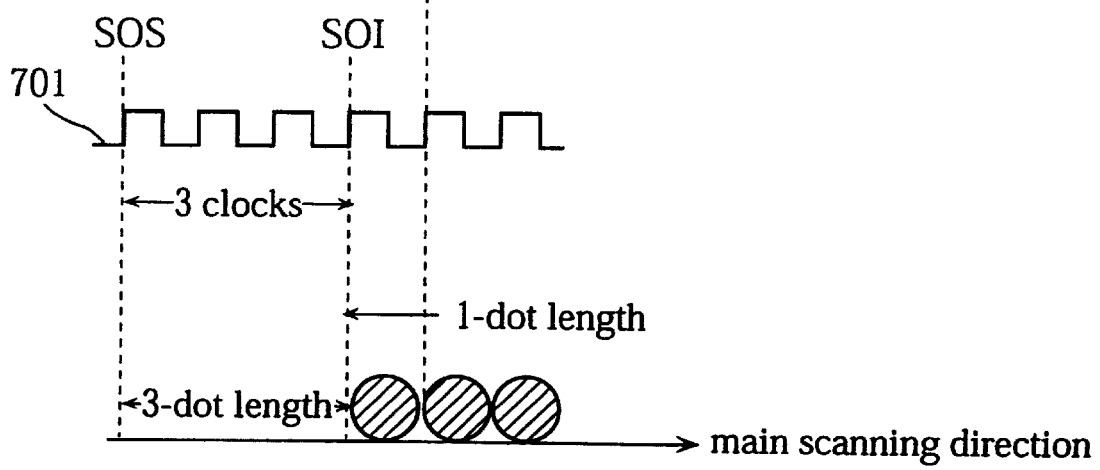

FIGS. 7A and 7B respectively show the relation between the timing of outputting the image data and a scanning start position. As shown in FIG. 7A, the image data is outputted after the period of time represented by 4 clocks has elapsed from the reception of the synchronizing signal (or, the SOS detection). The value "4" indicating the number of clocks is stored in an internal memory of the CPU 41. If the value "4" is changed to "3", for example, this means that the timing of outputting the image data is advanced by 1 clock (1 dot). More specifically, the scanning start position in FIG. 7A is shifted by 1 dot to the left in the main scanning direction as shown in FIG. 7B. Or, the scanning start position is shifted to the left by 1 dot as shown in FIGS. 6B and 6C. The CPU 41 holds information regarding this period of time represented by the number of clocks for each of the column address counters 423a to 432c. By adjusting the value representing the period of time in accordance with the laser beam being currently used as the reference beam, the scanning start position of the corresponding laser beam is adjusted. In the middle drawing of FIG. 6C, as one example, the value indicating the number of clocks is reduced to "3" for the beam spots 401a and 401b and the value is maintained at "4" for the beam spot 401c.

Using this method, the scanning start position can be shifted to both the right and left directions. However, the minimum counting unit of the counter is 1 dot (or, 1 clock), and therefore the adjustment less than 1 dot cannot be made.

For the beam spot 401a in FIG. 6C, the adjustment is accomplished only by reducing the value representing the period of time taken until the activation of the column address counter 432a to "3." Meanwhile, for the beam spot 401b, the adjustment is made using the stated two methods. Specifically, the value representing the period of time is reduced to "3" to shift the beam spot 401b to the left by 1 dot, and then the beam spot 401b is shifted to the right by a ½dot using the delay circuit 442. Consequently, by this two-step adjustment, the beam spot 401b in FIG. 6C is aligned with the beam spot 401c along the start line 610.

The CPU 41 reads the adjustment information 492 from the ROM 49 after the processing for switching the reference beam, and temporarily stores the adjustment information 492 into the internal memory to refer to when performing the scan processing.

The emission control circuit 42 controls the emission from the semiconductor laser array 51. In order to separately control the emissions of the laser beams 301a to 301c, the emission control circuit 42 uses drive circuits 421a, 421b, and 421c. These drive circuits 421a to 421c respectively correspond to the laser beams 301a to 301c.

The emission controlled by the emission control circuit 42 has three purposes. The first purpose is to have the laser beams 301a to 301c emitted to strike the surface of the photosensitive component 61 according to the light intensity based on the image data. The second purpose is to have the laser beam used as the reference beam forcefully emitted for the SOS detection. The third purpose is to have the laser beams 301a to 301c sequentially emitted for the APC.

The emission control circuit 42 informs the CPU 41 of the start and end timings of the emission for each laser beam, so that the emission period is measured for each laser beam.

The emission control circuit 42 performs the APC between the end of the emission to strike the surface of the photosensitive component 61 according to the image data and the emission of the reference beam for a next SOS detection. When doing so, in accordance with the current reference beam, the emission control circuit 42 changes an order in which the laser beams 301a to 301c are sequentially emitted for the APC. Hereinafter, the order of the laser beams 301a to 301c for the APC is referred to as the "emitting order." In the APC, the laser beams 301a to 301c are sequentially emitted under a predetermined drive current, and the photo diode 320 detects the light intensity for each of the laser beams 301a to 301c. In accordance with the detection results, the drive current is adjusted for each of the laser beams.

Figure 8A:
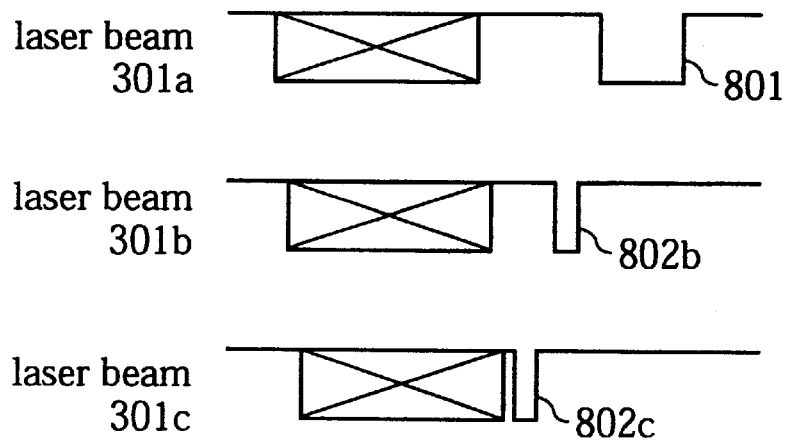
FIGS. 8A to 8C are timing charts showing timings at which the laser beams are emitted.

FIG. 8A is a timing chart of emissions 802b and 802c for the APC, an emission 801 for the APC and SOS detection, and the emissions for exposing the photosensitive component 61 by the laser beams 301a to 301c, when the laser beam 301a is used as the reference beam. In this example, after the emissions for exposing the photosensitive component 61, the laser beams 301c and 301b are emitted in this order for the APC. These emissions are indicated as the emissions 802c and 802b in FIG. 8A. As to the laser beam 301a, the light intensity is detected from the emission 801 which is also used for the SOS detection, and therefore the laser beam 301a does not need to be additionally emitted for the APC. Here, the APC processing needs to be completed before the synchronizing signal is generated. Therefore, the corresponding laser beams (in this case, 301b and 301c) should be emitted for the APC before the reference beam is emitted for the SOS detection.

Figure 8B:
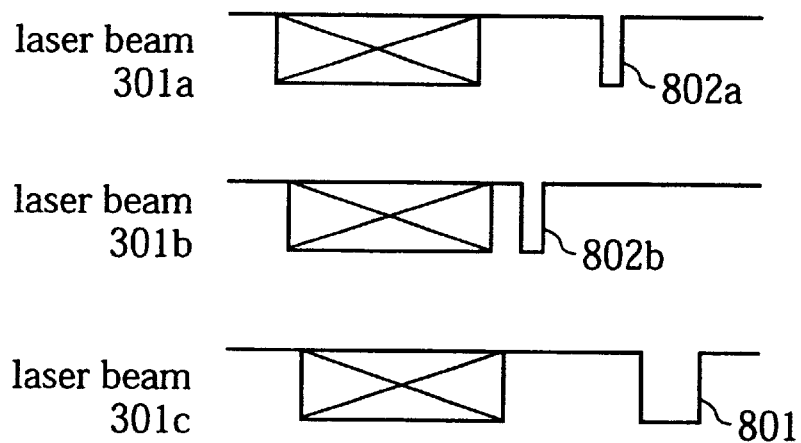

When the laser beam used as the reference beam is switched, the emission control circuit 42 also changes the emitting order of the laser beams 301a to 301c for the APC. FIG. 8B shows a case where the laser beam used as the reference beam is switched to the laser beam 301c. The emitting order of the laser beams 301a to 301c for the APC is 301b-301a-301c. Note again here that the emission of the laser beam 301c for the APC is also used for the SOS detection.

Figure 8C:
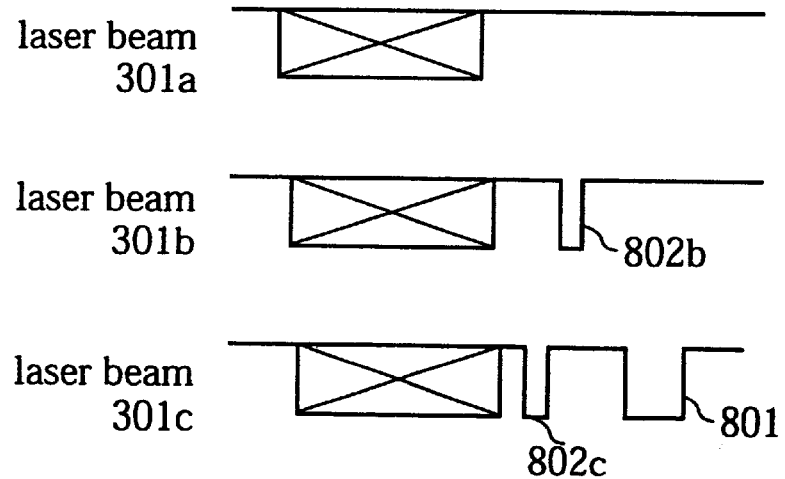

If the emitting order of the laser beams 301a to 301c is not changed when the laser beam used as the reference beam is switched, a problem occurs as shown in FIG. 8C. The laser beam 301c is emitted twice as indicated as the emission 802c for the APC and the emission 801 for the SOS detection, while the laser beam 301a is not emitted for the APC.

Operation of the CPU 41

The following is a description of operations performed by the CPU 41 for processing to switch the laser beam used as the reference beam (referred to as the "beam switch processing" hereinafter) and for processing to adjust the scanning start position between the laser beams 301a to 301c (referred to as the "position adjustment processing" hereinafter).

Figure 9:
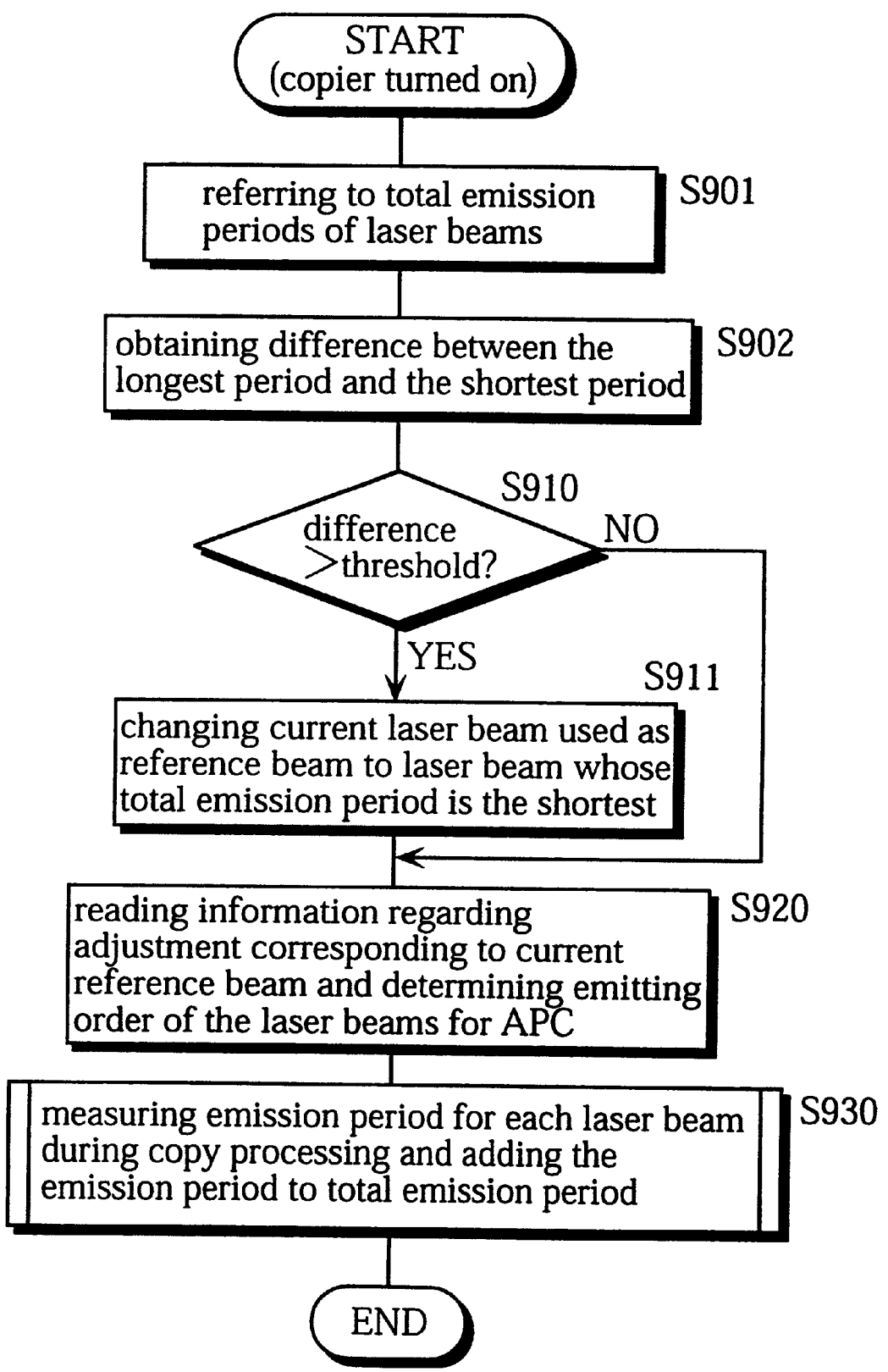
FIG. 9 is a flowchart showing the reference beam switch processing performed by a CPU.

FIG. 9 is a flowchart showing the beam switch processing performed by the CPU 41. When the copier 1 is turned on, the CPU 41 starts the operation for this processing according to the program stored in the ROM 49. The CPU 41 refers to the information regarding the total emission periods of the laser beams 301a to 301c that is stored in the total emission period memory 481 (step S901). The CPU 41 compares the total emission periods with each other, and obtains a difference between the longest period and the shortest period (step S902).

Then, the CPU 41 compares the difference with the threshold stored in the RAM 49 (step S910). If the difference exceeds the threshold ("YES" in step S910), the CPU 41 changes the ID stored as the current reference beam information 482 to the ID of the laser beam whose total emission period is the shortest (step S911). Meanwhile, if the difference is below the threshold ("NO" in step S910), the CPU 41 keeps the current ID as it is and proceeds to step S920.

On completion of the operation for the beam switch processing, the CPU 41 performs the following process in step S920. The CPU 41 reads the information regarding the adjustment to be made under the current reference beam from the adjustment information 492 and stores the read information in the internal memory. Simultaneously, the CPU 41 informs the emission control circuit 42 of the current reference beam to instruct to determine the emitting order of the laser beams 301a to 301c for the APC.

After the process in step S920, the components provided in the control unit 40 performs the respective operations such that the laser beams 301a to 301c are emitted for copy processing. During the copy processing, the emission period is measured for each of the laser beams 301a to 301c and added to the corresponding total emission period stored in the total emission period memory 481 (step S930). The accordingly updated total emission periods corresponding to the laser beams 301a to 301c are referred to for the beam switch processing when the copier 1 is next turned on.

Figure 10:
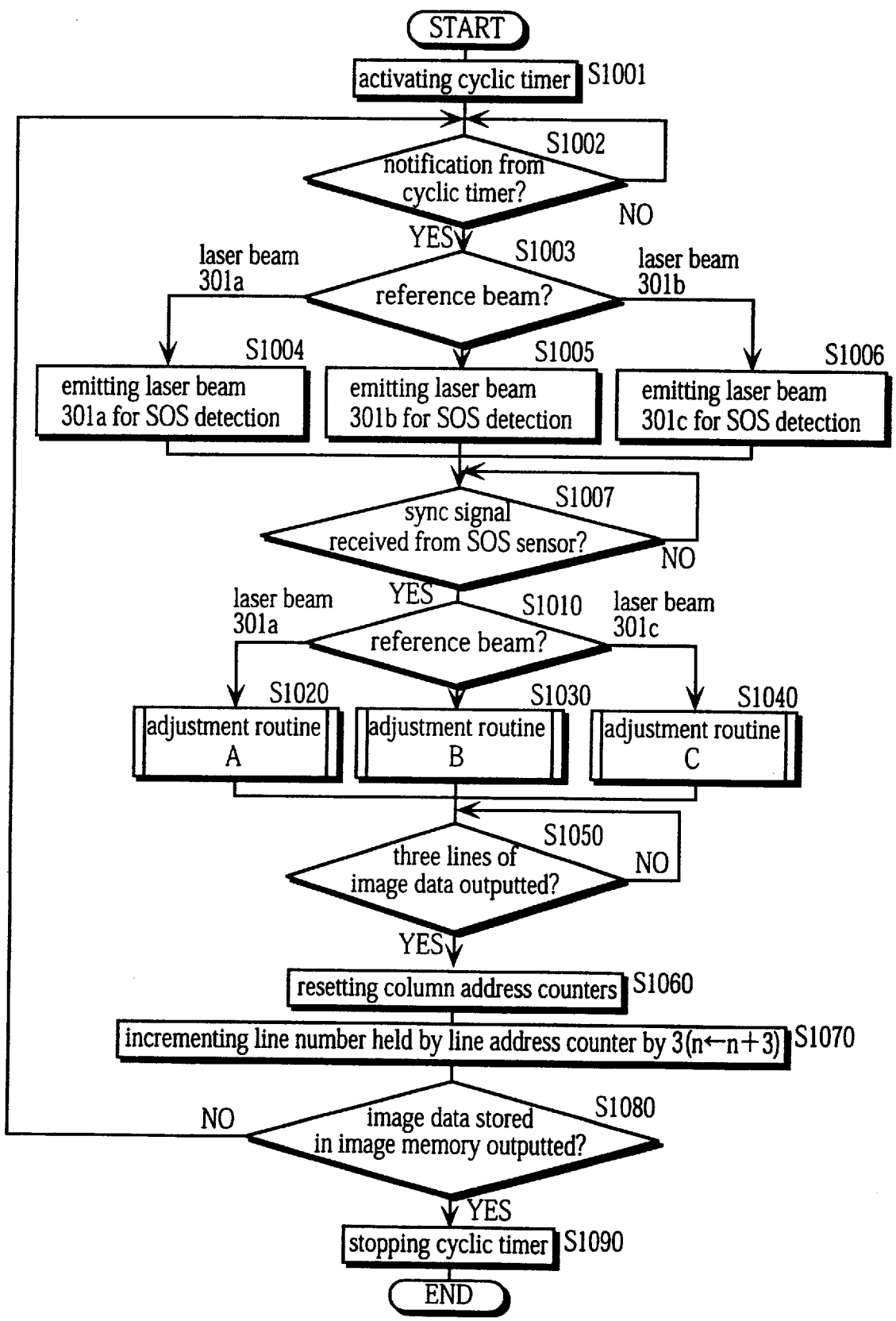
FIG. 10 is a flowchart showing a main routine of the processing performed by the CPU to adjust the scanning start positions.

FIG. 10 is a flowchart showing a main routine of the position adjustment processing performed by the CPU after giving the instruction to emit the reference beam for the SOS detection.

The CPU 41 is activated on receiving an instruction for executing copy processing from a user instruction reception unit (not illustrated). Then, the CPU 41 activates the cyclic timer 451 (step S1001).

When notified by the cyclic timer 451 that the predetermined period of time T1 has elapsed ("YES" in step S1002), the CPU 41 instructs the emission control circuit 42 to have the reference beam emitted (step S1003, and step S1004, S1005, or S1006).

When receiving the synchronizing signal from the SOS sensor 58 ("YES" in step S1007), the CPU 41 checks the laser beam used as the reference beam (step S1010) and calls an adjustment routine corresponding to the current reference beam (step S1020, S1030, or S1040).

The CPU 41 waits for the output of the three lines of image data to be finished for the current scanning process (step S1050). When it is finished ("YES" in step S1050), the CPU 41 resets each value of the column address counters 432a to 432c (step S1060). Also, the CPU 41 increments a line number (n) held by the line address counter 431 by 3 (step S1070). Then, the CPU 41 judges whether all lines of the image data stored in the image memory 31 have been outputted for the copy processing (step S1080). For doing so, the CPU 41 judges whether the value of the incremented line number exceeds the number of lines of image data stored in the image memory 31. If so ("YES" in step S1080), the CPU 41 stops the cyclic timer 451 (step S1090) and terminates the processing. If the image data to be outputted still remains in the image memory 31 ("NO" in step S1080), the CPU 41 returns to step S1002 and waits for the notification from the cyclic timer 451.

The processing for the APC is performed by the emission control circuit 42, and therefore is not described in the flowchart of FIG. 10. Note, however, that the APC is performed between the ends of steps S1050 and S1080.

The following is a description of the adjustment routines performed in step S1020, S1030, and S1040 corresponding to the current reference beam.

Figure 11:
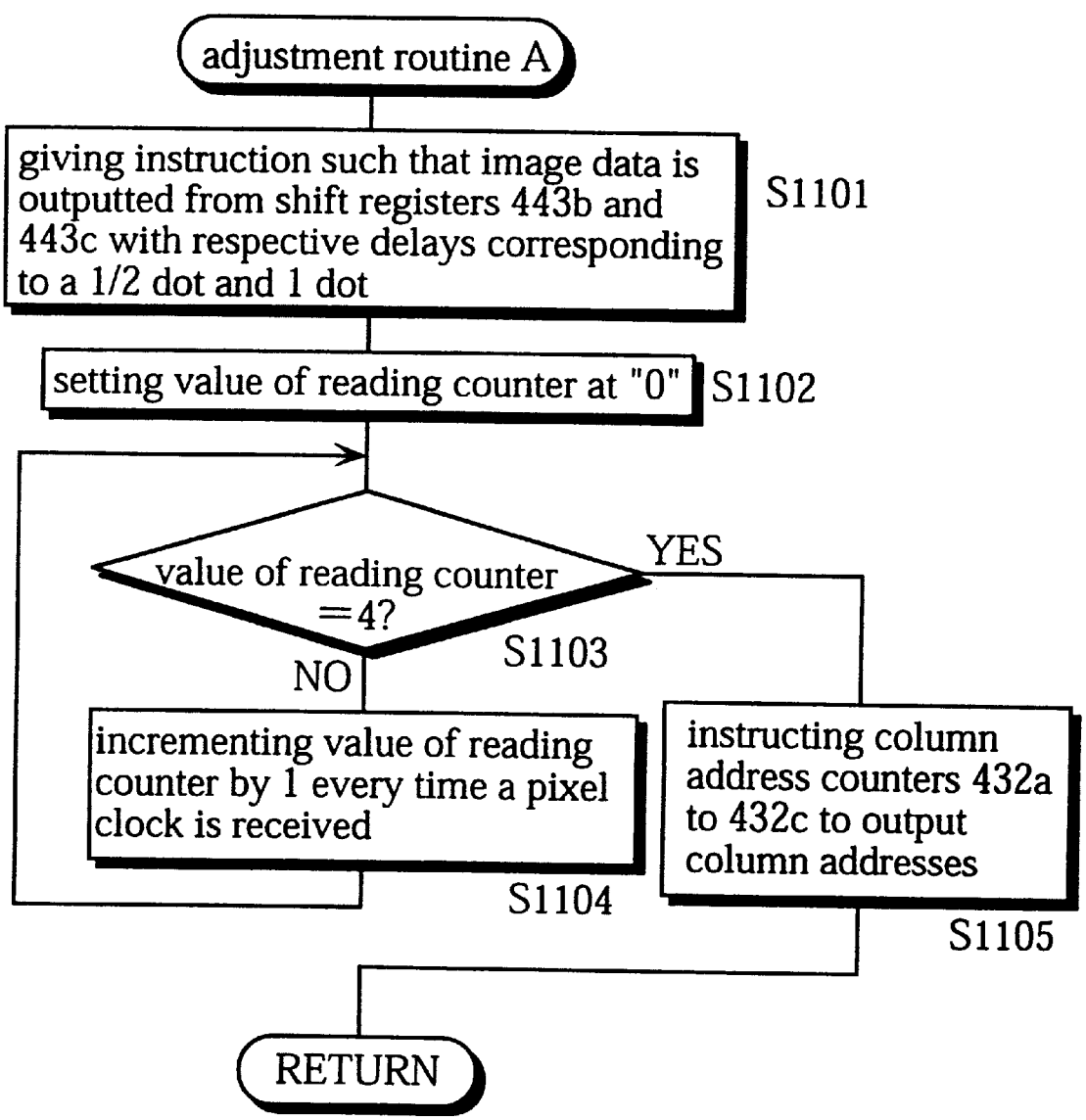
FIG. 11 is a flowchart of the process performed by the CPU to adjust the scanning start positions in accordance with the current reference beam.

FIG. 11 is a flowchart of the process for the position adjustment when the laser beam 301a is used as the reference beam. In this case, the adjustment to be made is shown in FIG. 6A. More specifically, the image data associated with the laser beam 301b is outputted from the shift register 443b with a delay of a period of time corresponding to a ½dot, and the image data associated with the laser beam 301c is outputted from the shift register 443c with a delay of a period of time corresponding to 1 dot.

When the laser beam 301a is used as the reference beam, the adjustment is made using the delay circuit 442 only. The adjustment made by changing the start timings of the processing performed by the column address counters 432a to 432c is not required.

The CPU 41 instructs the delay circuit 442 such that the image data associated with the laser beams 301b and 301c is outputted from the shift registers 443b and 443c to the emission control circuit 42 with respective delays corresponding to a ½dot and 1 dot (step S1101).

The CPU 41 then sets the value in the reading counter 411 at "0" that manages the start timings of the processing (i.e., outputting the corresponding column addresses) performed by the column address counters 432a to 432c (step S1102). The CPU 41 increments the value of the reading counter 411 by 1 every time a pixel clock is received from the frequency dividing circuit 471 (step S1104).

When the value of the reading counter 411 becomes "4" ("YES" in step S1103), the CPU 41 instructs the column address counters 432a to 432c to start outputting the corresponding column addresses to the image data memory 31 (step S1105).

Figure 12:
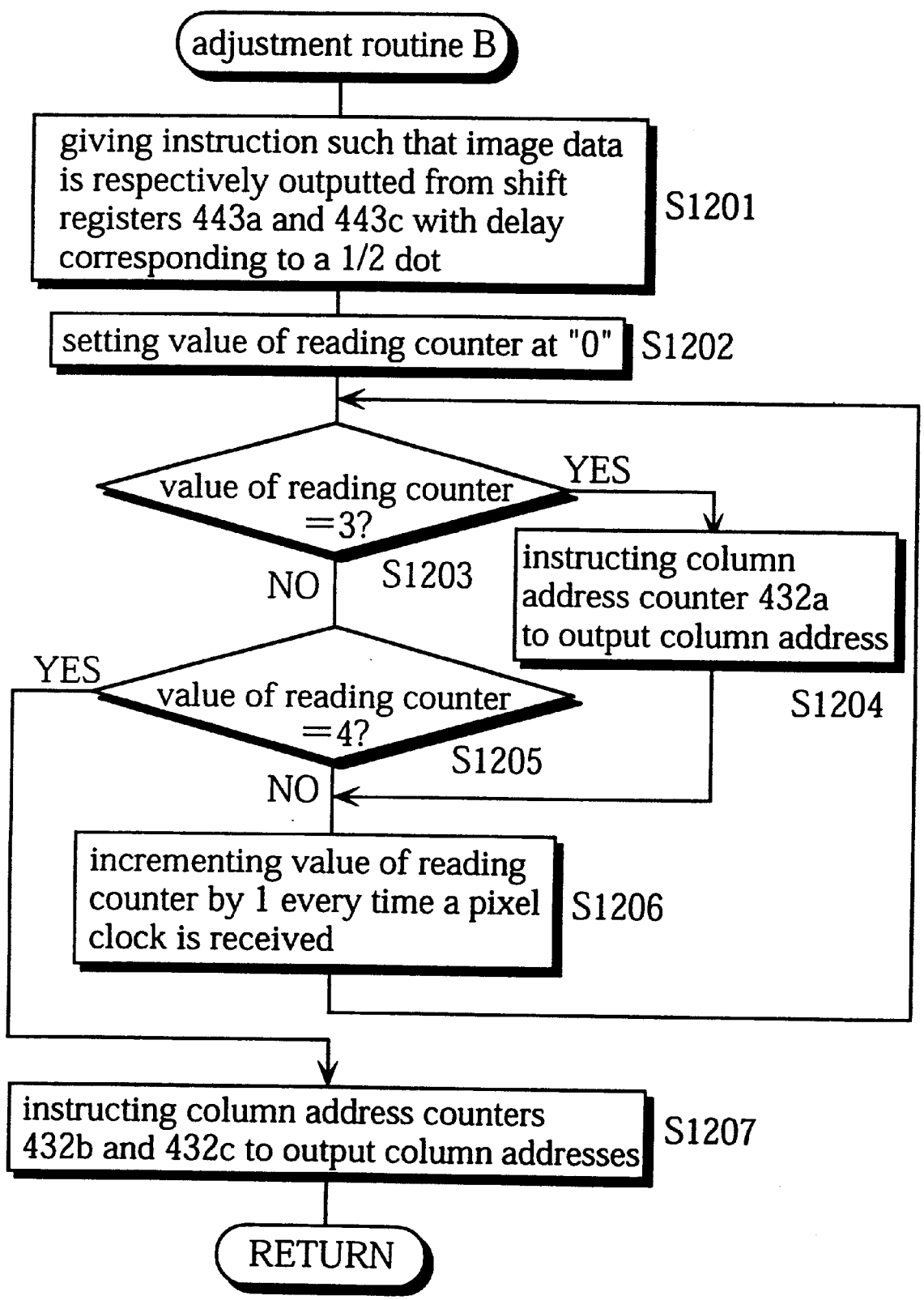
FIG. 12 is a flowchart of the process performed by the CPU to adjust the scanning start positions in accordance with the current reference beam.

FIG. 12 is a flowchart of the process for the position adjustment when the laser beam 301b is used as the reference beam. In this case, the adjustment to be made is shown in FIG. 6B. More specifically, the output of the image data associated with the laser beam 301a from the image data memory 31 is advanced by 1 clock (that is, the image data is outputted when the value of the reading counter 411 becomes "3"), and then delayed by a period of time corresponding to a ½dot. Also, the output of the image data associated with the laser beam 301c from the shift register 443c is delayed by the period of time corresponding to a ½dot.

The CPU 41 instructs the delay circuit 442 such that the image data associated with the laser beams 301a and 301c is outputted from the shift registers 443a and 443c to the emission control circuit 42 with respective delays corresponding to a ½dot (step S1201).

The CPU 41 then sets the value of the reading counter 411 at "0" that manages the start timings of the processing performed by the column address counters 432a to 432c (step S1202). The CPU 41 increments the value of the reading counter 411 by 1 every time a pixel clock is received from the frequency dividing circuit 471 (step S1206).

When the value of the reading counter 411 becomes "3" ("YES" in step S1203), the CPU 41 instructs the column address counter 432a to start outputting the corresponding column address to the image data memory 31 (step S1204). When the value becomes "4" ("YES" in step S1205), the CPU 41 instructs the column address counters 432b and 432c to start outputting the corresponding column addresses (step S1207). Thus, the image data associated with the laser beam 301a is outputted 1 clock (1 dot) earlier than the image data associated with the laser beams 301b and 301c. Consequently, the scanning start position of the laser beam 301a is shifted by 1 dot to the left (as viewed in FIG. 6) in the main scanning direction.

Figure 13:
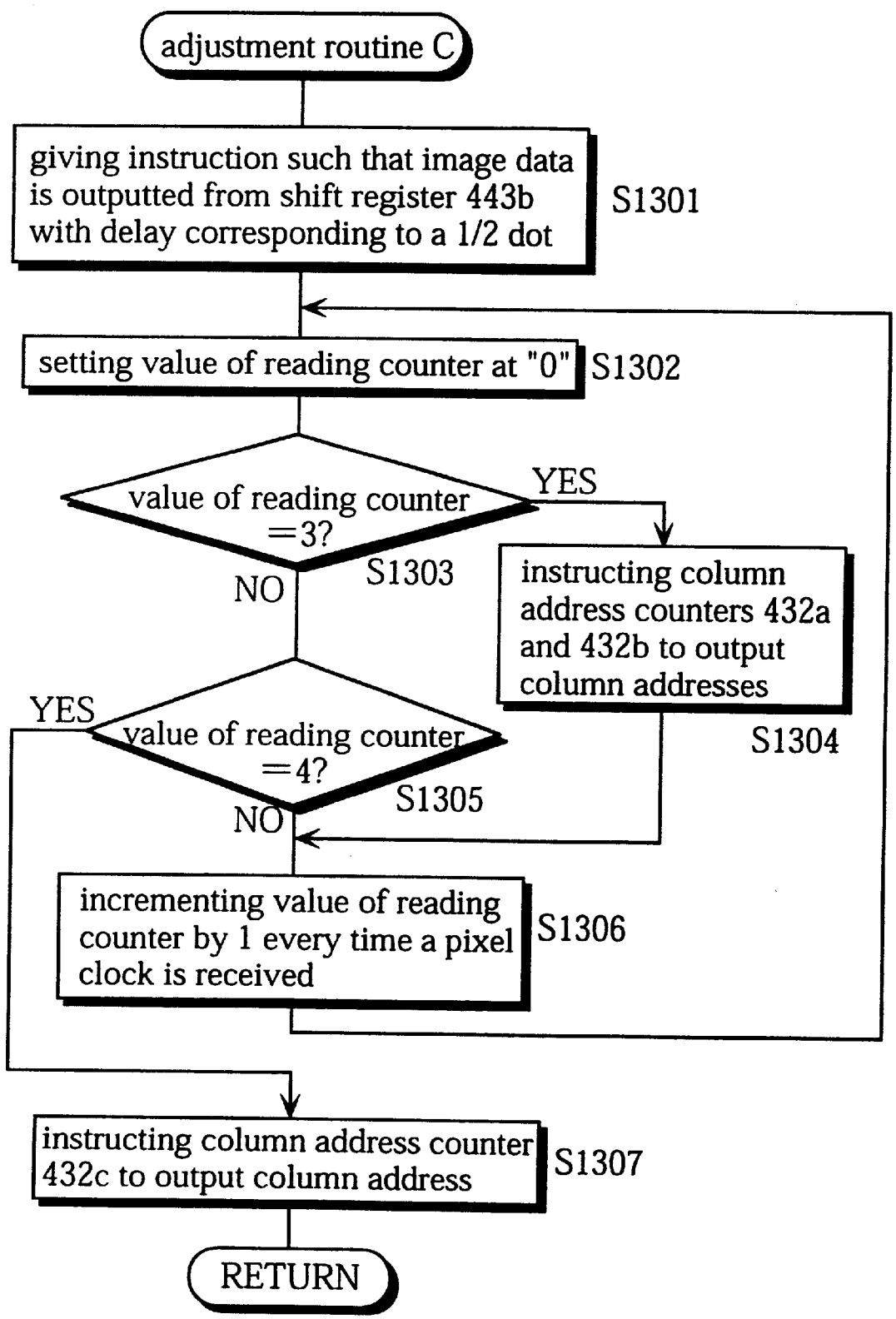
FIG. 13 is a flowchart of the process performed by the CPU to adjust the scanning start positions in accordance with the current reference beam.
Figure 14:
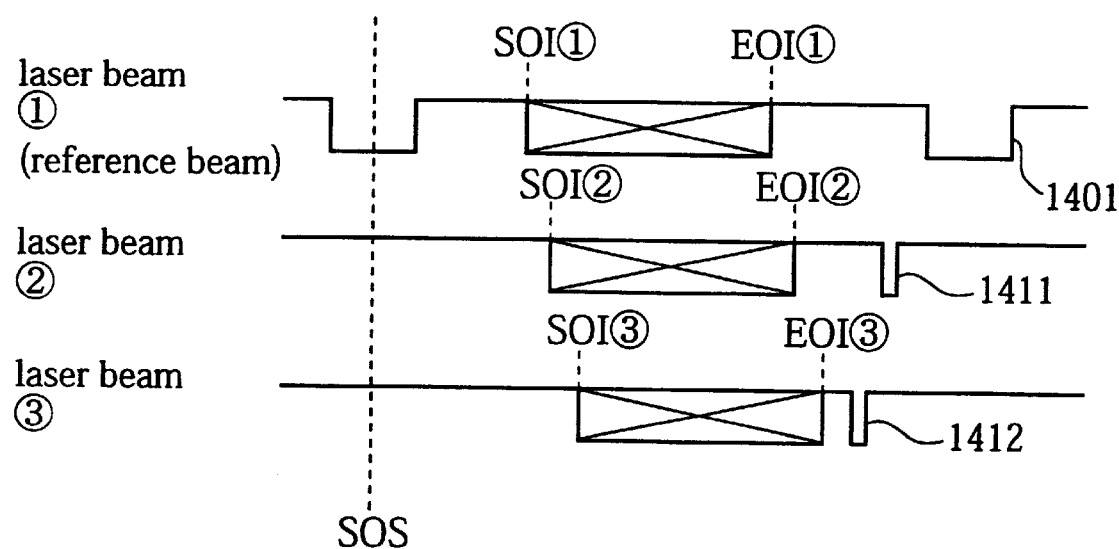
FIG. 14 is a timing chart showing the timings at which the laser beams are emitted from a conventional semiconductor laser array employing the multi-beam method.

FIG. 13 is a flowchart of the process for the position adjustment when the laser beam 301c is used as the reference beam. In this case, the adjustment to be made is shown in FIG. 6C. More specifically, the output of the image data associated with the laser beam 301a is advanced by 1 clock, that is, the image data is outputted when the value of the reading counter 411 becomes "3". The image data associated with the laser beam 301b is advanced by 1 clock and delayed by the period of time corresponding to a ½dot when outputted from the shift register 443b.

The CPU 41 instructs the delay circuit 442 such that the image data associated with the laser beams 301b is outputted from the shift registers 443b to the emission control circuit 42 with a delay corresponding to a ½dot (step S1301).

The CPU 41 then sets the value of the reading counter 411 at "0" that manages the start timings of the processing performed by the column address counters 432a to 432c (step S1302). The CPU 41 increments the value of the reading counter 411 by 1 every time a pixel clock is received from the frequency dividing circuit 471 (step S1306).

When the value of the reading counter 411 becomes "3" ("YES" in step S1303), the CPU 41 instructs the column address counters 432a and 432b to start outputting the corresponding column addresses (step S1304). When the value becomes "4" ("YES" in step S1305), the CPU 41 instructs the column address counter 432c to start outputting the corresponding column address (step S1307). Thus, the image data associated with the laser beams 301a and 301b is outputted 1 clock (1 dot) earlier than the image data associated with the laser beam 301c. Consequently, the scanning start positions of the laser beams 301a and 301b are shifted by 1 dot to the left (as viewed in FIG. 6) in the main scanning direction.

As clearly understood from the above explanation, in the copier 1 of the present embodiment, the laser beam used as the reference beam is switched according to the total emission periods of the laser beams 301a to 301c. As such, load of emitting the reference beam is evenly divided between the light sources of the laser beams 301a to 301c. Therefore, the life of the semiconductor array 51 is longer than that of a semiconductor array used in a case where the specific laser beam is always used as the reference beam. After the switching of the reference beam, the processing for the position adjustment and the emitting order of the laser beams for the APC are accordingly changed. Thus, no problems occur due to the beam switch processing.

In the present embodiment, the beam switch processing is performed when the copier 1 is turned on. However, the timing to perform the beam switch processing is not limited to this. For example, the beam switch processing may be performed whenever one cycle of the copy processing has been completed, whenever a predetermined number of copies have been made, or whenever a predetermined period of time has elapsed.

In the present embodiment, the laser beam used as the reference beam is switched according to the difference between the total emission periods. As a result, the total emission periods of the laser beams are kept almost equal to each other. However, the beam switch processing may be performed according to a total amount of light calculated by integrating the intensity of a laser beam over each emission period. Since each laser beam does not emit light with a constant intensity, the life of each light source is affected not just by the total emission period, but also by the intensity of the light emitted during such period.

To switch the laser beam used as the reference beam according to the total amounts of light emitted by the laser beams, the amount of light emitted when a laser beam strikes one scanning line can first be found by multiplying the emission period for one scanning line by the average intensity of light over the scanning line. Thereafter, this value only needs to be added to a memory storing the total amount of light for each laser beam whenever that laser beam strikes one line. Then, if a difference between the greatest and smallest total values exceeds a threshold at a given time, such as when the copier is turned on, the laser beam used as the reference beam is switched to the laser beam whose total amount of light is the smallest.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An optical scanning device comprising:
   a plurality of light sources which each emit a laser beam;
   a scanning unit which repetitively scans the laser beams emitted by the plurality of light sources;
   a load accumulating unit which accumulates a load for each of the light sources;
   a selector which selects one of the light sources in accordance with the accumulation results obtained by the load accumulating unit, a beam emitted by the selected light source being a reference beam; and
   a sensor which receives the reference beam at a predetermined position and outputs a synchronizing signal in response to the reception of the reference beam, the synchronizing signal being used for separately setting timings at which the light sources will respectively emit the laser beams to form an image in accordance with image information.

2. The optical scanning device of claim 1, wherein the load is a cumulative emitting period of time during which a light source has emitted a laser beam.

3. The optical scanning device of claim 1, wherein the load is a cumulative amount of light emitted by a light source.

4. The optical scanning device of claim 1, wherein the laser beams that are emitted by the light sources at a time strike an object at different positions in a direction perpendicular to a scanning direction.

5. The optical scanning device of claim 1 further comprising:
   a timing setting unit which separately sets the timings based on the synchronizing signal from the sensor, depending on the light source selected by the selector.

6. The optical scanning device of claim 1, wherein the light sources comprises a semiconductor laser array which is capable of emitting a plurality of laser beams.

7. The optical scanning device of claim 1, wherein the selector selects the one of the light sources when the optical scanning device is turned on.

8. An optical scanning device comprising:
   a plurality of light sources which each emit a laser beam;
   a scanning unit which repetitively scans the laser beams emitted by the plurality of light sources;
   a selector which selects one of the light sources, a beam emitted by the selected light source being a reference beam;
   a sensor which receives the reference beam at a predetermined position and outputs a synchronizing signal in response to the reception of the reference beam, the synchronizing signal being used for separately setting timings at which the light sources will respectively emit the laser beams to form an image in accordance with image information;
   a timing setting unit which separately sets the timings based on the synchronizing signal from the sensor, depending on the light source selected by the selector;
   a memory which stores the image information; and
   a drive circuit which inputs the image information read from the memory and applies a drive current to the light sources so as to have the laser beams emitted in accordance with the image information, wherein
      the timing setting unit includes at least one of an adjusting section and a delay section, the adjusting section changing at least one of reading timings of the image information from the memory for a light source, and the delay section delaying at least one of the transmission timings of the image information to the drive circuit for a light source.

9. An optical scanning device comprising:
   a plurality of light sources which each emit a laser beam;
   a scanning unit which repetitively scans the laser beams emitted by the plurality of light sources;
   a selector which selects one of the light sources, a beam emitted by the selected light source being a reference beam;
   a sensor which receives the reference beam at a predetermined position and outputs a synchronizing signal in response to the reception of the reference beam, the synchronizing signal being used for separately setting timings at which the light sources will respectively emit the laser beams to form an image in accordance with image information;
   a timing setting unit which separately sets the timings based on the synchronizing signal from the sensor, depending on the light source selected by the selector, wherein
      a light intensity of each laser beam varies with a drive current applied to each light source,
      the optical scanning device further comprises an emission control unit which has the light sources sequentially emit the laser beams under a reference current, detects the light intensity of each laser beam, and controls the drive current of each light source in accordance with the detected light intensity, and
      the emission control unit changes an emitting order in which the light sources sequentially emit the laser beams under the reference current, depending on the light source selected by the selector.

10. An image forming apparatus comprising:
   an optical scanning device which includes
      a plurality of light sources which each emit a laser beam, a scanning unit which repetitively scans the laser beams emitted by the plurality of light sources;

a load accumulating unit which accumulates a load for each of the light sources, a selector which selects one of the light sources in accordance with the accumulation results obtained by the load accumulating unit, a beam emitted by the selected light source being a reference beam, and a sensor which receives the reference beam at a predetermined position and outputs a synchronizing signal in response to the reception of the reference beam, the synchronizing signal being used for separately setting timings at which the light sources will respectively emit the laser beams to form an image in accordance with image information; and an image holding component on which an image is formed by the optical scanning device.

11. An optical scanning device which scans a plurality of laser beams, the optical scanning device comprising:

a plurality of light sources which each emit a light beam;

a changing unit which changes a current light source used for emitting a reference beam to another light source;

a sensor which receives a reference beam emitted by the changed light source at a predetermined position and outputs a reference signal in response to the reception of the reference beam;

a controller which separately sets timings at which the light sources will emit the laser beams in accordance with the image information, based on the reference signal.

12. The optical scanning device of claim 11, further comprising:

a load accumulating unit which accumulates a load for each of the light sources, wherein the changing unit changes the light source used for emitting the reference beam in accordance with the accumulation results obtained by the load accumulating unit.

13. The optical scanning device of claim 12, wherein the load is a cumulative emitting period of time during which a light source has emitted a laser beam.

14. The optical scanning device of claim 11, wherein the controller, when separately setting the timings, adjusts the timings depending on the light source used for emitting the reference beam.

15. An optical scanning device which scans a plurality of laser beams, the optical scanning device comprising:

a plurality of light sources which each emit a laser beam;

a sensor which receives a reference beam emitted by one of the light sources at a predetermined position and outputs a reference signal in response to the reception of the reference beam;

a controller which separately sets timings at which the light sources will emit the laser beams in accordance with the image information, based on the reference signal; and a switching unit which switches the light sources used for emitting the reference beam, wherein the light intensity of each laser beam varies with a drive current applied to each light source, the optical scanning device further comprises an emission control unit which has the light sources sequentially emit the laser beams under a reference current, detects the light intensity of each laser beam, and controls the driver current of each light source in accordance with the detected light intensities, and the emission control unit changes an emitting order in which the light sources sequentially emit the laser beams under the reference current, depending on the light source used for emitting the reference beam.

16. An image forming apparatus comprising:

an optical scanning device which scans a plurality of laser beams, including a plurality of light sources which each emit a laser beam, a changing unit which changes a current light source used for emitting a reference beam to another light source, a sensor which receives a reference beam emitted by the changed light source at a predetermined position and outputs a reference signal in response to the reception of the reference beam, and a controller which separately sets timings at which the light sources will emit the laser beams in accordance with the image information, based on the reference signal; and an image holding component on which an image is formed by the optical scanning device.

17. A scanning method for scanning a plurality of laser beams at a time, the plurality of laser beams having been modulated with image information on being respectively emitted by a plurality of light sources, the scanning method including:

an accumulating step of accumulating a load for each of the light sources;

a selecting step of selecting one of the light sources in accordance with the accumulation results obtained by the accumulating step;

an emitting step of emitting a reference beam from the selected light source;

an outputting step of outputting a synchronizing signal from a sensor in response to a reception of the reference beam;

a setting step of separately setting, in accordance with the synchronizing signal, timings at which the light sources will emit the laser beams in accordance with the image information; and a scanning step of scanning the laser beams.

* * * * *